United States Patent [19]
Okawa et al.

[11] Patent Number: 4,748,210
[45] Date of Patent: May 31, 1988

[54] VINYL CHLORIDE-GRAFTED ETHYLENE COPOLYMER AND PROCESS FOR PRODUCING SAME

[75] Inventors: Masahisa Okawa, Ehime; Tomoyuki Emura, Kanagawa; Yoshitaka Owatari, Saitama; Kentaro Mashita, Chiba; Toshio Kawakita, Osaka, all of Japan

[73] Assignee: Sumitomo Chemical Co., Ltd., Osaka, Japan

[21] Appl. No.: 63,992

[22] Filed: Jun. 19, 1987

[30] Foreign Application Priority Data

Jun. 25, 1986 [JP] Japan ................. 61-150563

[51] Int. Cl.$^4$ ................. C08F 255/02; C08F 265/02; C08F 265/04
[52] U.S. Cl. ................. 525/260; 525/263; 525/285; 525/74
[58] Field of Search ................. 525/285, 301, 260, 263

[56] References Cited

U.S. PATENT DOCUMENTS 2,824,862  2/1958  Longley ................. 525/285
4,661,549  4/1987  Walker ................. 525/75

FOREIGN PATENT DOCUMENTS 1097020  12/1967  United Kingdom .
1146579   3/1969  United Kingdom .
2091745   8/1982  United Kingdom .

Primary Examiner—Carman J. Seccuro
Attorney, Agent, or Firm—Cushman, Darby & Cushman

[57] ABSTRACT

Vinyl chloride-grafted ethylene copolymer superior in adhesiveness both to metals, glasses or polar high molecular materials such as polyamides and to non-rigid vinyl chloride resins is provided in which backbone polymer is copolymer of ethylene, ester of monohydric alcohol of 1–8 carbon atoms with acrylic acid or methacrylic acid and maleic anhydride and pendant or grafting polymer is vinyl chloride polymer. This copolymer is produced by graft-polymerization of vinyl chloride onto the ethylene-acrylic or methacrylic ester-maleic anhydride copolymer.

11 Claims, No Drawings

VINYL CHLORIDE-GRAFTED ETHYLENE COPOLYMER AND PROCESS FOR PRODUCING SAME

BACKGROUND OF THE INVENTION

This invention relates to vinyl chloride-grafted ethylene copolymer and a process for producing same. More particularly, it relates to vinyl chloride-grafted ethylene-acrylic or-methacrylic ester-maleic anhydride copolymer and a process for producing same.

Polyolefins represented by polyethylene and polypropylene are economically produced in a large amount and widly used, since they have superior mechanical strength, electric characteristics and processability and are inexpensive and useful for general-purpose. However, difficulty is encounted when lamination is made between polyolefins and other materials to prepare composite articles, since polyolefins are so nonpolar that they are poor in adhesiveness.

For improvement of adhesiveness of polyolefins, there is a method where ethylene is copolymerized with a copolymerizable and adhesiveness-impartable component such as glycidyl methacrylate or maleic anhydride (cf. Japanese Patent Examined Publication No. 27517/71, etc.). Furthermore, there are the methods where unsaturated carboxylic acid or its anhydride such as acrylic acid or maleic anhydride is grafted on polyolefins such as polyethylene to introduce a polar group, thereby imparting adhesiveness to metals, glasses or polar high molecular materials such as nylon (polyamide) (cf. Japanese Patent Examined Publication Nos. 18392/62 and 32654/77). Although these copolymers are relatively good in adhesiveness to metals, glasses or for example, polyamides, they have substantially no adhesiveness to non-rigid vinyl chloride resin which is one of the most widely used high molecular materials.

There are also proposed many methods of grafting vinyl chloride on ethylene copolymers such as ethylene-vinyl acetate copolymer and ethylenemethyl methacrylate copolymer (cf. Japanese Patent Examined Publication Nos. 27876/64 and 14229/68) and the products are utilized as wire coating materials, an impact strength modifier for vinyl chloride polymers, etc. These vinyl chloride-grafted ethylene copolymers have small adhesiveness to polymers of relatively high polarity such as polyamides and polyesters. For example, waterproof fabrics prepared by lamination of non-rigid vinyl chloride resin and a base fabric made of such as polyamide or polyester, using the vinyl chloride-grafted ethylene copolymer as an adhesive, are inferior in adhesion and have no sufficient strength.

SUMMARY OF THE INVENTION

This invention is to provide ethylene copolymers excellent in adhesiveness to metals, glasses or polar high molecular materials such as polyamides, etc. and besides to non-rigid vinyl chloride resins.

DESCRIPTION OF THE INVENTION

This invention relates to vinyl chloride-grafted ethylene copolymers which conmprises copolymer having backbone polymer made from ethylene, the ester of monohydric alcohol of 1–8 carbon atoms with acrylic acid or methacrylic acid [hereinafter referred to as "(meth)acrylic ester"] and maleic anhydride, and a pendant or grafting polymer made from vinyl chloride polymer.

The backbone polymer moiety of ethylene(meth)acrylic ester-maleic anhydride copolymer in the present copolymer is preferably in an amount of 50–98% by weight, more preferably 60–95% by weight on the basis of the present copolymer. When the backbone polymer moiety is less than 50% by weight, no remarkable improvement is obtained in adhesiveness to polyamides, polyesters and the like.

The vinyl chloride polymer as pendant polymer moiety is in an amount of 2–50%, preferably 5–40% by weight, on the basis of the present copolymer. When it is less than 2% by weight, adhesiveness to non-rigid vinyl chloride resin is insufficient.

In this invention, the fact that the vinyl chloride copolymer moiety is graft polymerized on the backbone polymer of ethylene-(meth)acrylic estermaleic anhydride copolymer is critical. Mere blend of the ethylene-(meth)acrylic ester-maleic anhydride copolymer and the vinyl chloride polymer fails to give adhesiveness desired in this invention. The superior adhesiveness both to metals, glasses or polar high molecular materials such as polyamides and to non-rigid vinyl chloride resins is obtained only by graft polymerization of the pendant vinyl chloride polymer onto the backbone ethylene copolymer and, resulting in chemical bonding between them.

The backbone ethylene-(meth)acrylic estermaleic anhydride copolymer used in this invention contains preferably 5–40% by weight of (meth)acrylic ester unit and 0.5–5% by weight of maleic anhydride unit, on the basis of the backbone polymer. When the (meth)acrylic ester unit is less than 5% by weight, adhesiveness to polar polymers such as polyamide is not sufficient and when the maleic anhydride unit is less than 0.5% by weight, adhesiveness to polyamide or the like is not sufficient, either.

Furthermore, the backbone copolymer has a melt flow index (referred to as "MI" hereinafter), preferably, within the range of 1–200 g/10 min.

Commercially available product of said ethylene-(meth)acrylic ester-maleic anhydride copolymer is, for example, "BONDINE" ® of Simika-CdF Chimie Co. Limited. Said copolymer may be produced, for example, by a high pressure bulk polymerization method as described in British Pat. No. 2091745.

The pendant vinyl chloride polymer may be polymer of vinyl chloride alone or copolymer of vinyl chloride with a small amount of other vinyl comonomers polymerizable therewith. Such comonomers are, for example, fatty acid vinyl esters, vinylidene halides, (meth)acrylic acid alkyl esters, alkylvinyl ethers, ethylene, propylene, etc. The use of the comonomer enhances adhesiveness of the present vinyl chloride-grafted ethylene copolymer.

The vinyl chloride-grafted ethylene copolymer of this invention may be produced by radical polymerization of vinyl chloride in the presence of ethylene(meth)acrylic ester-maleic anhydride copolymer.

As polymerization method, there may be used suspension polymerization, bulk polymerization, emulsion polymerization and solution polymerization employed for polymerization of known vinyl chloride polymers. In general, suspension polymerization in an aqueous medium using free-radical initiators is preferred.

Polymerization temperature is 20°–100° C. taking into account the temperature where half-life time of a radical initiator is 10 hours which is usually applied in radical polymerization.

The free-radical initiators are not critical and there may be used any of those which are commonly used in polymerization of vinyl chloride. As examples thereof, mention may be made of organic peroxides such as benzoyl peroxide, lauroyl peroxide, diisopropyl peroxydicarbonate, di-2-ethylhexyl peroxydicarbonate, t-butyl peroxypivalate, etc., azo compounds such as azobisisobutyronitrile, azobis 2,3-dimethylvaleronitrile, etc. These initiators may be used alone or in combination.

An amount of the initiator to be employed is 0.01–10% by weight of the backbone polymer.

Molecular weight of the pendant polymer may be controlled by conducting the polymerization in the presence of a chain-transfer agent such as mercaptanes and halogenated hydrocarbons.

Polymerization method is explained in more detail with reference to suspension polymerization.

As a suspension agent, there may be used gelatin, polyvinyl alcohol, water-soluble cellulose ether which are familiar to suspension polymerization of vinyl chloride. An amount of the suspension agent to be employed is 0.01–10% by weight on the basis of the backbone polymer.

PH regulators may also be used. To this effect, inorganic salts such as sodium hydrogen-carbonate, sodium dihydrogenphosphate, disodium hydrogenphosphate, etc. may be used. An amount of these pH regulators is 0.01–10% by weight based on the backbone polymer.

An amount of vinyl chloride monomer to be used in the polymerization is determined so that content of vinyl chloride is within the range of 2–50% by weight on the basis of the vinyl chloride-grafted ethylene copolymer to be obtained. That is, this amount is calculated from an amount corresponding to the 2–50% by weight taking into account the conversion rate of vinyl chloride monomer to polymer. The conversion rate of vinyl chloride is preferably at least 40% in order to sufficiently produce the pendant polymer moiety.

According to this invention, there are provided ethylene copolymers and a process for preparing same, the copolymers to having superior adhesiveness both to metals, glasses or polar high molecular materials such as polyamide, etc. and to non-rigid vinyl chloride resins. Such superior adhesiveness has never been attained by any of the conventional techniques.

This invention will be further explained by the following examples. The items observed in this invention were measured in the following methods.

(a) Melt flow index (MI):

This is measured in accordance with JIS K-6760 (190° C., 2.16 Kg load).

(b) Content of vinyl chloride component in polymer:

The sample is burnt in an oxygen atmosphere in a flask and the combustion gas produced is absorbed in an alkali liquid. This liquid is subjected to titration with silver nitrate to obtain chlorine content, from which content of vinyl chloride is calculated.

(c) Hexane extraction insoluble:

The sample is subjected to extraction with hot hexane for 24 hours in a Soxhlet extractor using a wire cloth of 350 meshes and ratio of extraction residue to amount of the sample is taken as hexane extraction insoluble.

The ethylene-(meth)acrylic ester-maleic anhydride copolymer is soluble in hot hexane, but a graft polymer thereof with vinyl chloride is insoluble. The vinyl chloride polymer itself is also insoluble.

(d) Grafting rate on backbone polymer (%):

From the above results of measurement, the grafting rate is calculated by the equation:

$$[(c)-(b)]/[100-(b)] \times 100.$$

(e) Adhesion strength:

(1) Adhesion strength to polyamide: A film of polymer to be tested (100 μm thick) is superposed on a film of polyamide (100 μm thick; "RAYPHANE" ®T1401 produced by Toray Synthetic Film Co.) and the films are subjected to a heat sealer under the conditions of temperature: 180° C., pressure: 4 Kg/cm$^2$G and time: 5 minutes until the films are allowed to adhere. Then, this embodied film is cut into strips (10 mm wide). Polyamide film of this strip is peeled off at an angle of 180° at a pulling rate of 200 mm/min. by a tensile tester to obtain a peel strength, which is taken as the above captioned adhesion strength.

(2) Adhesion strength to non-rigid vinyl chloride resin: A film of polymer to be tested (100 μm thick) is put between sheets of non-rigid vinyl chloride resin ("KANEVINYL COMPOUND" ®KVC4400X produced by Kanegafuchi Chemical Co. Ltd.) (2 mm thick each) and the sheets are pressed by a pressing machine under the conditions of temperature: 180° C., pressure: 10 Kg/cm$^2$G and time: 3 minutes. Then, the pressed sheet is cut into strips (10 mm wide). This strip is subjected to T-peeling test at a pulling rate of 100 mm/min. by a tensile tester to obtain peel strength, which is taken as the above captioned adhesion strength.

EXAMPLE 1

In a stainless steel autoclave were charged 100 parts by weight of deionized water, 80 parts by weight of ethylene-ethyl acrylate-maleic anhydride copolymer (67.5/30/2.5% by weight; MI: 8), 0.2 part by weight of hydroxypropylmethyl cellulose ("METHOLOSE" ®65SH-50 produced by Shin-etsu Chemical Co. Ltd.), 0.15 part by weight of disodium hydrogenphosphate (Na$_2$HPO$_4$.12H$_2$O), 0.2 part by weight of di-2-ethylhexyl peroxydicarbonate and 0.2 part by weight of t-butyl peroxypivalate and the autoclave was subjected to deaeration to 30 mmHg. Thereafter, 20 parts by weight of vinyl chloride monomer were charged therein and the content was heated to 60° C. with stirring to initiate polymerization. After 4 hours, polymerization was discontinued, unaltered vinyl chloride monomer was purged and the contents were taken out and dehydrated and dried.

The thus obtained graft copolymer was evaluated and the results are shown in Table 1.

EXAMPLE 2

In a stainless steel autoclave were charged 100 parts by weight of deionized water, 70 parts by weight of ethylene-ethyl acrylate-maleic anhydride copolymer (72.3/25/2.7% by weight; MI: 10), 0.1 part by weight of "METHOLOSE" ®65SH50, 0.15 part by weight of disodium hydrogenphosphate, 0.05 part by weight of di-2-ethylhexyl peroxydicarbonate and 0.05 part by weight of t-butyl peroxypivalate and the autoclave was subjected to deaeration to 30 mmHg. Then, 30 parts by weight of vinyl chloride monomer were charged therein and the content was stirred at room temperature for 30 minutes, followed by heating to 60° C. with stirring to initiate polymerization.

After 5 hours, polymerization was discontinued, unaltered vinyl chloride monomer was purged and the contents were taken out and dehydrated and dried.

The results of evaluation of thus obtained graft copolymer was evaluated and the results are shown in Table 1.

EXAMPLE 3

In a stainless steel autoclave were charged 100 parts by weight of deionized water, 80 parts by weight of the same ethylene-ethyl acrylate-maleic anhydride copolymer as used in Example 1, 0.1 part by weight of "METHOLOSE" ®65SH-50 and 0.08 part by weight of di-2-ethylhexyl peroxydicarbonate and the autoclave was subjected to deaeration to 30 mmHg. Then, 20 parts by weight of vinyl chloride monomer was charged therein, followed by heating to 50° C. with stirring to initiate polymerization.

After 9 hours, the polymerization was dicontinued, unaltered vinyl chloride monomer was purged and the contents were taken out and dehydrated and dried.

The thus obtained graft copolymer was evaluated and the results are shown in Table 1.

EXAMPLE 4

In a stainless steel autoclave were charged 100 parts by weight of deionized water, 50 parts by weight of the same ethylene-ethyl acrylate-maleic anhydride copolymer as used in Example 1, 0.2 part by weight of "METHOLOSE" ®65SH-50 and 0.2 part by weight of azobisisobutyronitrile and the autoclave was subjected to deaeration to 30 mmHg. Then, 50 parts by weight of vinyl chloride monomer were charged therein, followed by heating to 60° C. with stirring to initiate polymerization.

After 10 hours, the polymerization was discontinued, unaltered vinyl chloride monomer was purged and the contents were taken out and dehydrated and dried.

The thus obtained graft copolymer was evaluated and the results are shown in Table 1.

EXAMPLE 5

In a stainless steel autoclave were charged 100 parts by weight of deionized water, 80 parts by weight of ethylene-ethyl acrylate-maleic anhydride copolymer (72/25/3% by weight; MI: 40), 0.2 part by weight of "METHOLOSE" 65SH-50, 0.15 part by weight of disodium hydrogenphosphate, 0.2 part by weight of di-2-ethylhexyl peroxydicarbonate and 0.2 part by weight of t-butyl peroxypivalate and the autoclave was subjected to deaeration to 30 mmHg. Then, 20 parts by weight of vinyl chloride monomer was charged therein, followed by stirring at room temperature for 30 minutes and then heating to 60° C. with stirring to initiate polymerization.

After 3 hours, the polymerization was discontinued, unaltered vinyl chloride monomer was purged and the contents were taken out and dehydrated and dried.

The thus obtained graft copolymer was evaluated and the results are shown in Table 1.

EXAMPLE 6

Example 3 was repeated except for using the vinyl chloride monomer in an amount of 10 parts by weight. The results are shown in Table 1.

EXAMPLE 7

Example 3 was repeated except for using the vinyl chloride monomer in an amount of 19 parts by weight and the vinyl acetate monomer in an amount of 1 part by weight. The results are shown in Table 1.

COMPARATIVE EXAMPLE 1

Evaluation was effected on the ethylene-ethyl acrylate-maleic anhydride copolymer used in Example 1 as a backbone polymer.

The results are shown in Table 1.

COMPARATIVE EXAMPLE 2

The ethylene-ethyl acrylate-maleic anhydride copolymer used as backbone polymer in Example 1 and polyvinyl chloride resin ("SUMILIT" ®Sx8G produced by Sumitomo Chemical Industries Company, Limited) were roll kneaded at a ratio of 85 parts:15 parts by weight to obtain a blend.

Evaluation was effected on this blend and the results are shown in Table 1.

COMPARATIVE EXAMPLE 3

Comparative Example 2 was repeated except that the ratio of the ethylene-ethyl acrylate-maleic anhydride copolymer and the polyvinyl chloride resin was 70 parts:30 parts by weight. The thus obtained copolymer was evaluated and the results are shown in Table 1.

COMPARATIVE EXAMPLE 4

Evaluation was effected on the ethylene-ethyl acrylate-maleic anhydride copolymer used as backbone polymer in Example 5 and the results are shown in Table 1.

COMPARATIVE EXAMPLE 5

In a stainless steel autoclave were charged 100 parts by weight of deionized water, 25 parts by weight of the ethylene-ethyl acrylate-maleic anhydride copolymer used in Example 1, 0.2 part by weight of "METHOLOSE" 65SH-50 and 0.2 part by weight of azobisisobutyronitrile and the autoclave was subjected to deaeration to 30 mmHg. Then, 75 parts by weight of vinyl chloride monomer was charged therein, followed by heating to 60° C. with stirring to initiate polymerization.

After 9 hours, the polymerization was discontinued, unaltered vinyl chloride monomer was purged and the content was taken out and dehydrated and dried. Evaluation was effected on thus obtained graft copolymer and the results are shown in Table 1.

TABLE 1

|  | (b) Content of vinyl unit component (wt %) | (c) Hexane extraction insoluble (wt %) | (d) Grafting rate on backbone polymer (%) | (e)-(1) Adhesion strength to polyamide (g/cm) | (e)-(2) Adhesion strength to non-rigid vinyl chloride resin (g/cm) |
| --- | --- | --- | --- | --- | --- |
| Example 1 | 15.7 | 65.8 | 59.4 | 860 | 1600 |
| Example 2 | 22.5 | 74.1 | 66.6 | 790 | 1600 |
| Example 3 | 11.5 | 63.5 | 58.8 | 940 | 1300 |

TABLE 1-continued

|  | (b) Content of vinyl unit component (wt %) | (c) Hexane extraction insoluble (wt %) | (d) Grafting rate on backbone polymer (%) | (e)-(1) Adhesion strength to polyamide (g/cm) | (e)-(2) Adhesion strength to non-rigid vinyl chloride resin (g/cm) |
|---|---|---|---|---|---|
| Example 4 | 38.8 | 87.5 | 79.6 | 450 | 1700 |
| Example 5 | 12.0 | 76.7 | 73.5 | 710 | 1500 |
| Example 6 | 6.5 | 48.9 | 45.3 | 680 | 1000 |
| Example 7 | 12.1 | 63.0 | 57.9 | 930 | 1400 |
| Comparative Example 1 | 0 | 0.1 | — | 920 | 200 |
| Comparative Example 2 | 15.0 | 15.8 | 0 | 20 | 200 |
| Compartive Example 3 | 30.0 | 29.7 | 0 | 30 | 100 |
| Comparative Example 4 | 0 | 1.0 | — | 880 | 300 |
| Comparative Example 5 | 71.5 | 92.1 | 72.2 | 50 | 1700 |

We claim:

1. Vinyl chloride-grafted ethylene copolymer which comprises, as the backbone polymer, a copolymer comprising ethylene, an ester of a monohydric alcohol of 1-8 carbon atoms with acrylic acid or methacrylic acid and maleic anhydride and, as the pendant polymer, a vinyl chloride polymer.

2. Vinyl chloride-grafted ethylene copolymer according to claim 1 which comprises 50-98% by weight of the backbone polymer and 2-50% by weight of the pendant polymer, on the basis of the copolymer.

3. Vinyl chloride-grafted ethylene copolymer according to claim 2 which comprises 60-95% by weight of the backbone polymer and 5-40% by weight of the pendant polymer.

4. Vinyl chloride-grafted ethylene copolymer according to claim 1 wherein the acrylic or methacrylic ester in the backbone polymer is in an amount of 5-40% by weight and the maleic anhydride is in an amount of 0.5-5% by weight, on the basis of the backbone polymer.

5. Vinyl chloride-grafted ethylene copolymer according to claim 1 wherein the backbone polymer has a melt flow index of 1-200 g/10 min.

6. Vinyl chloride-grafted ethylene copolymer according to claim 1 wherein the vinyl chloride polymer as pendant polymer is a vinyl chloride homopolymer or a vinyl chloride copolymer with a small amount of other vinyl monomer.

7. A process for producing vinyl chloride-grafted ethylene copolymer which comprises polymerizing vinyl chloride together with copolymer of ethylene, ester of monohydric alcohol of 1-8 carbon atoms with acrylic acid or methacrylic acid and maleic anhydride in the presence of a free-radical initiator.

8. A process according to claim 7 wherein the polymerization is suspension polymerization, bulk polymerization, emulsion polymerization or solution polymerization.

9. A process according to claim 7 wherein the initiator is organic peroxide or azo compound.

10. A process according to claim 7 wherein an amount of the initiator is 0.01-10% by weight on the basis of copolymer of ethylene, ester of monohydric alcohol of 1-8 carbon atoms with acrylic or methacrylic acid and maleic anhydride.

11. A process according to claim 7 wherein a small amount of monomer copolymerizable with vinyl chloride is used together with vinyl chloride.

* * * * *